US005548271A

United States Patent [19]

Tsuchiyama et al.

[11] Patent Number: 5,548,271

[45] Date of Patent: Aug. 20, 1996

[54] DATA DISPLAY RADIO PAGER

[75] Inventors: Kinya Tsuchiyama; Masahiro Matai, both of Tokyo, Japan

[73] Assignee: NEC Corporation, Japan

[21] Appl. No.: 265,668

[22] Filed: Jun. 24, 1994

[30] Foreign Application Priority Data

Jun. 28, 1993 [JP] Japan .................................... 5-178529

[51] Int. Cl.$^{6}$ ................................ H04Q 1/30; G08B 5/22

[52] U.S. Cl. .................................. 340/311.1; 340/825.44; 345/102; 368/227

[58] Field of Search ............................ 340/311.1, 825.44, 340/825.45; 345/102, 4; 368/30, 83, 84, 226, 227, 241, 242

[56] References Cited

U.S. PATENT DOCUMENTS

| | | | |
|---|---|---|---|
| 4,644,350 | 2/1987 | Ishii | 340/825.44 |
| 4,649,381 | 3/1987 | Masuda et al. | 345/102 |
| 4,868,563 | 9/1989 | Stair et al. | 340/311.1 |
| 4,876,537 | 10/1989 | Oyamada | 340/825.44 |
| 4,945,350 | 7/1990 | Kawamura | 345/102 |
| 5,087,906 | 2/1992 | Eaton et al. | 340/825.44 |
| 5,185,604 | 2/1993 | Nepple et al. | 340/825.44 |
| 5,192,947 | 3/1993 | Neustein | 340/311.1 |

FOREIGN PATENT DOCUMENTS 62-198735 12/1987 Japan .

*Primary Examiner*—Brent A. Swarthout
*Attorney, Agent, or Firm*—Ostrolenk, Faber, Gerb & Soffen, LLP

[57] ABSTRACT

In a data display radio pager, light emitting diodes (LEDs) for alerting the user of the pager to an incoming call are disposed in a backlight together with LEDs for backlighting a liquid crystal display (LCD) for message display. The alert LEDs effect an alert via the LCD and flash in a striking color different from the color of light to issue from the backlight LEDs. The radio pager is miniature despite that the LCD and alert LEDs are arranged on the front of the casing of the pager.

15 Claims, 4 Drawing Sheets

DATA DISPLAY RADIO PAGER

BACKGROUND OF THE INVENTION

The present invention relates to a data display radio pager having a liquid crystal display (LCD) provided with a backlight and, more particularly, to a data display radio pager having a miniature configuration.

A data display radio pager having an LCD for displaying a message is extensively used today. The LCD is usually provided with a backlight which allows the user of the pager to see the LCD in the dark. Specifically, when the user operates a button switch provided on the casing of the pager, light emitting diodes (LEDs) are turned on to illuminate the LCD, so as to provide a backlight. Such backlight LEDs are also turned on when, for example, the power switch of the pager is turned on or when a call is received by the pager. In many cases, the backlight LEDs emit yellow-green light which brightly illuminates the LCD for easy recognition of messages displayed thereon. On the other hand, it has been customary to provide this kind of pager with alert LEDs in addition to the backlight LEDs. When the power switch of the pager is turned on or when a paging signal is received by the pager, the alert LEDs are turned on to inform the user of such a condition. The alert LEDs emit red light or similar striking light.

The problem with the conventional data display radio pager is that the alert LEDs, provided in addition to the backlight LEDs, have to be arranged on the surface of the pager together with the LCD. Specifically, the LCD for message display has a large area and has to be positioned on the front of the casing of the pager in order to facilitate recognition. Therefore, it is necessary to locate the alert LEDs next to the LCD on the front of the pager casing or on one side of the pager casing. For example, a radio pager having alert LEDs located next to a message display LCD is disclosed in Japanese Utility Model Laid-Open Publication No. 62-198735.

However, locating the alert LEDs next to the LCD on the front of the pager casing is undesirable for the following reason. In a card type pager available today, which is extremely thin and small, the LCD occupies a substantial area on the front of the pager casing. Hence, the alert LEDs cannot be positioned next to the LCD unless the front area of the casing, i.e., the horizontal and vertical dimensions of the pager are increased, which prevents miniaturization of the pager. On the other hand, when the alert LEDs are mounted on one side of the pager casing, they are difficult to see and, therefore, apt to cause the user to overlook an alert signal.

SUMMARY OF THE INVENTION

It is, therefore, an object of the present invention to provide a data display radio pager which is miniature despite having an LCD with a backlight and alert LEDs arranged together on the front of the casing of the pager.

A data display radio pager of the present invention comprises an LCD provided with at least one backlight LED for illuminating the LCD, and a backlight structure for accommodating, together with the backlight LED, at least one alert LED for alerting a user of the radio pager to an incoming call in the LCD.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
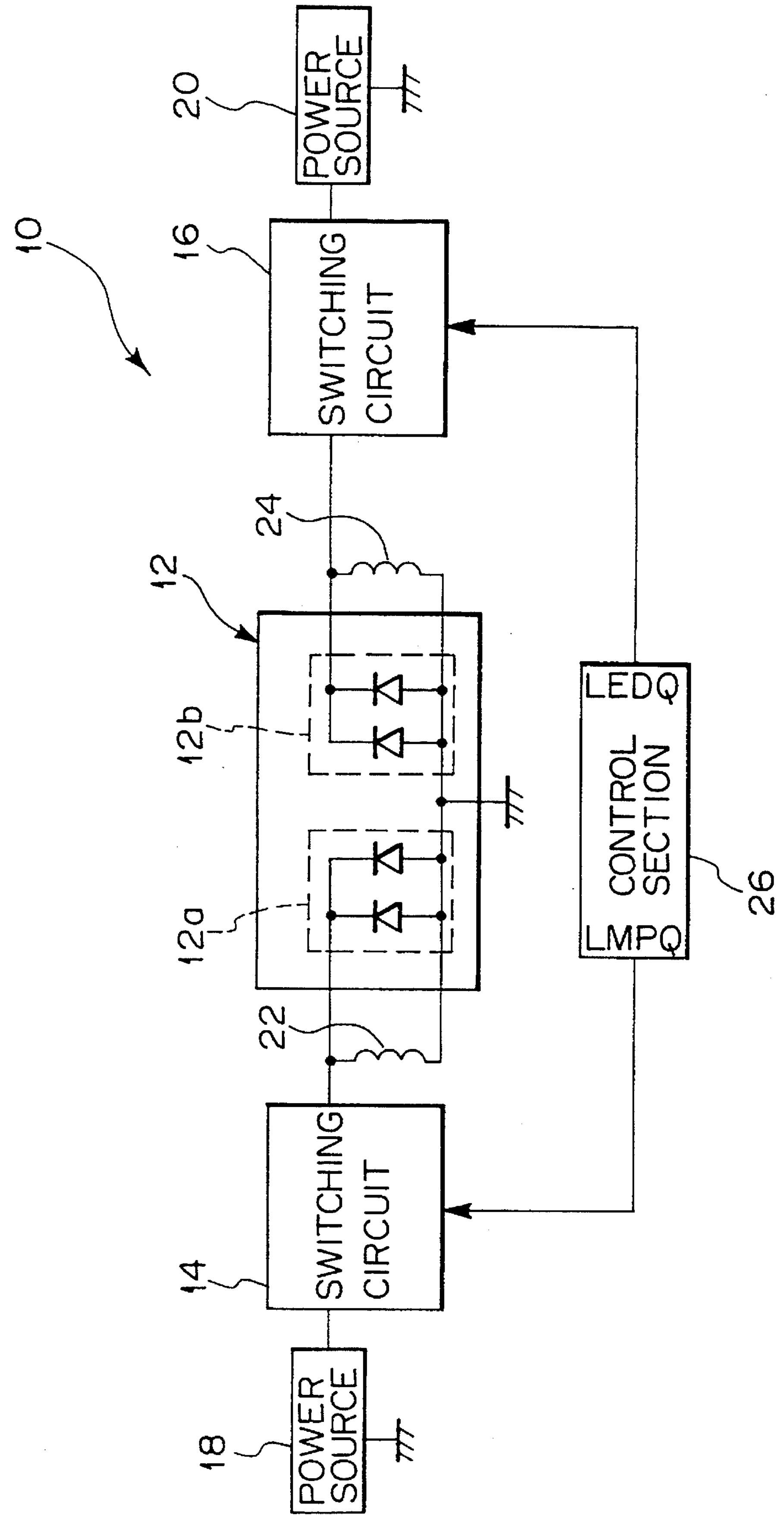
FIG. 1 is a block diagram schematically showing a data display radio pager embodying the present invention.

Referring to FIG. 1 of the drawings, a data display radio pager embodying the present invention is shown. As shown, the pager, generally 10 has an LCD 12 provided with backlight LEDs 12*a* and alert LEDs 12*b*. Switching circuits 14 and 16 turn on and turn off the backlight LEDs 12*a* and alert LEDs 12*b*, respectively. Power sources 18 and 20 are respectively connected to the backlight LEDs 12*a* and alert LEDs 12*b* via the switching circuits 14 and 16. A control section 26 controls the switching circuits 14 and 16. The reference numerals 22 and 24 each designates a booster coil. The backlight LEDs 12*a* are disposed in the LCD 12. In the illustrative embodiment, the alert LEDs 12*b* are also disposed in the LCD 12.

Figure 2:
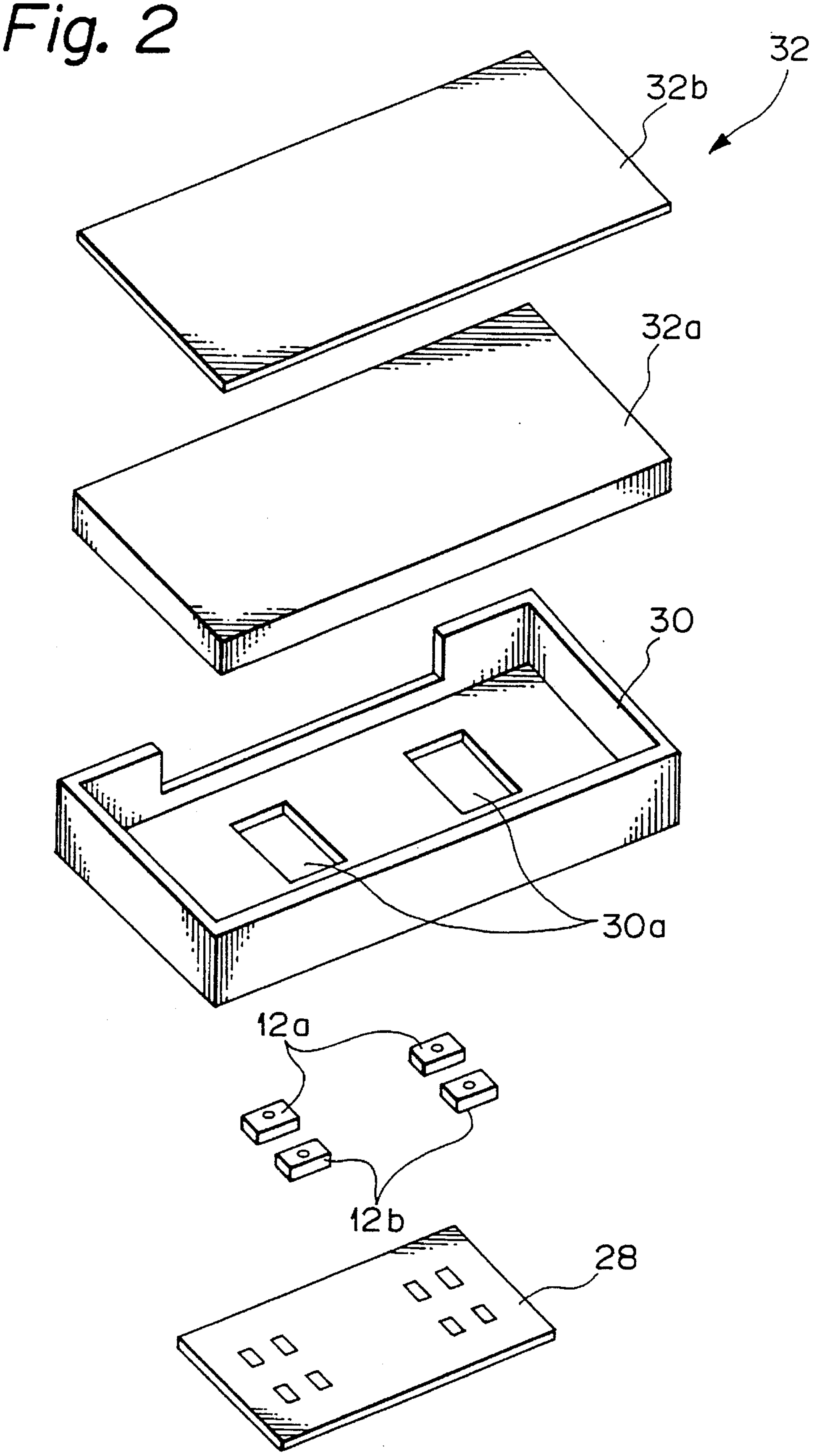
FIG. 2 is a fragmentary exploded perspective view showing a specific backlight structure included in the embodiment.

FIG. 2 shows a specific structure of a backlight 32 accommodating the backlight LEDs 12*a* and alert LEDs 12*b*. As shown, in the backlight 32, the LEDs 12*a* and 12*b* are mounted on a printed circuit board 28. A rectangular saucer-like reflection frame 30 is formed with windows 30*a* through the bottom thereof. The circuit board 28 is fitted on the bottom of the reflection frame 30 such that the LEDs 12*a* and 12*b* each protrudes into the frame 30 via one of the windows 30*a*. A light conducting plate 32*a* is received in the reflection frame 30 over the LEDs 12*a* and 12*b*. Further, a diffusion sheet 32*b* is provided on the light conducting plate 32*a*.

Figure 3A:
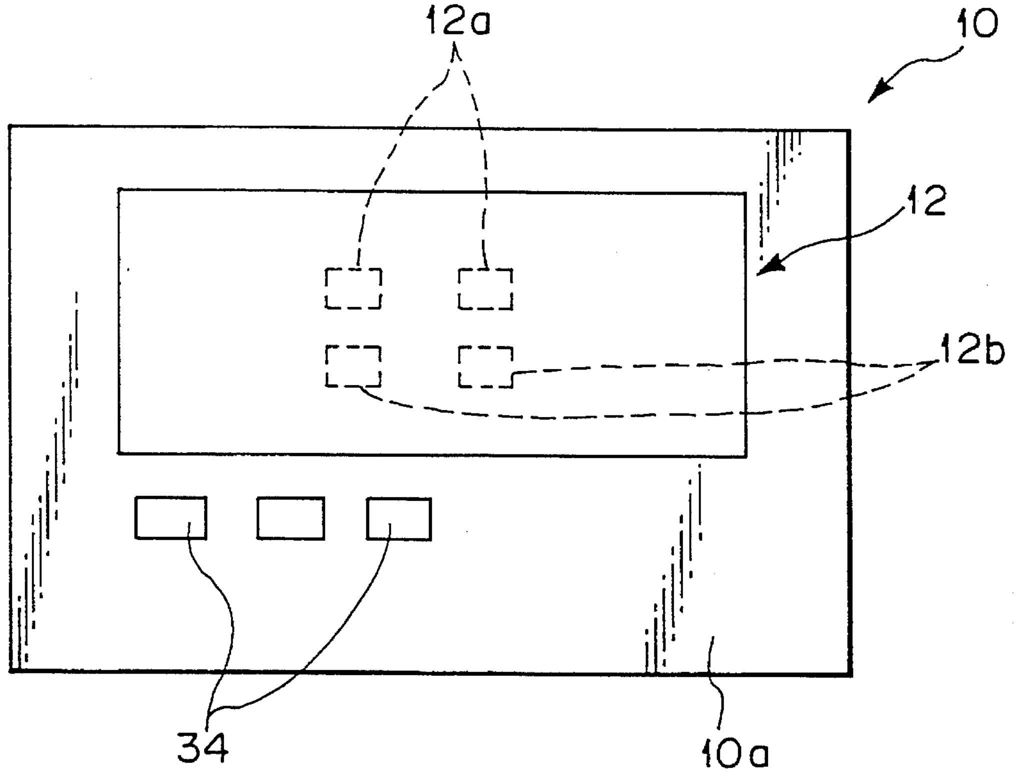
FIGS. 3A and 3B are respectively a front view and a section view of the embodiment.
Figure 3B:
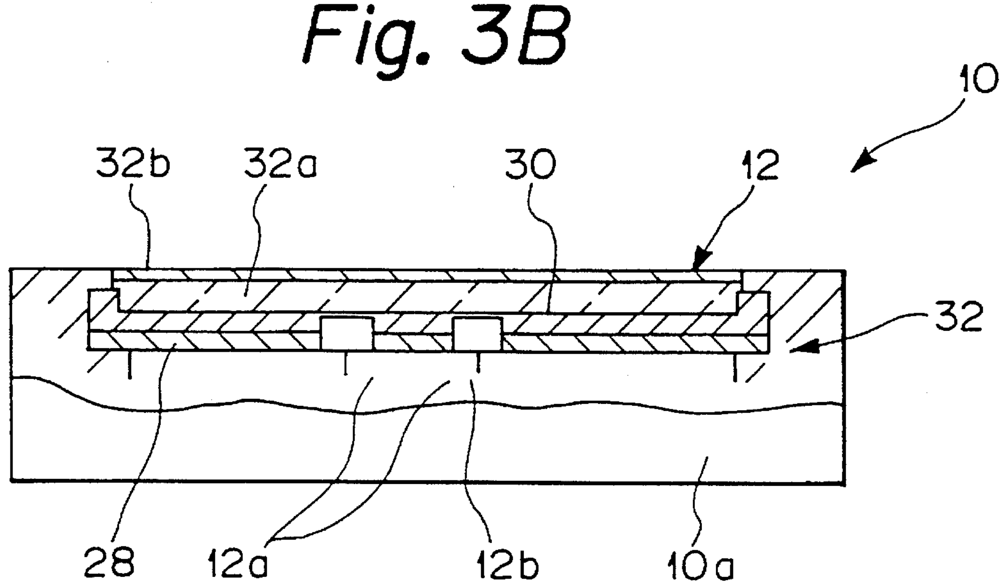

As shown in FIGS. 3A and 3B, the backlight 32 is received in the casing 10*a* of the pager 10 and extends along the rear of the LCD 12. When the backlight LEDs 12*a* are turned on, light emitted therefrom is extended to around the LEDs 12*a* by the light conducting plate 32*a* and then diffused by the diffusion sheet 32*b*. As a result, the light illuminates the LCD 12 from the rear uniformly. In the illustrative embodiment, the light from the LEDs 12*a* is yellow-green light which is high in visual sensitivity and, therefore, brightly illuminates the LCD 12. When the alert LEDs 12*b* are turned on, light from the LEDs 12*b* are diffused in the same manner as the light from the LEDs 12, thereby illuminating the LCD 12. In the embodiment, the light from the LEDs 12*b* is red light and, therefore, highlights the LCD 12 in red. Button switches 34 are arranged on the front of the casing 10*a* of the pager 10.

The pager 10 is operated in substantially the same manner as a conventional pager. Briefly, on receiving a signal, the pager 10 demodulates it while shaping the waveform, compares the demodulated signal with an address number, or identification number, assigned to the pager 10, and if the former is identical with the latter, causes the alert LEDs 12*b* to flash, causes a speaker to produce an alert tone, or otherwise alerts the user of the pager to the received call.

Assume that the pager 10 has received a call or that the user desires to see a message on the LCD 12. Then, as the user presses predetermined one of the button switches 34, the control section 26 sequentially delivers a high level signal and a low level signal to the switching circuit 14 via an output port LMPQ thereof. On receiving the high level signal first, the switching circuit 14 applies a voltage of 1 V from the power source 18 to the booster coil 22. The booster coil 22 boosts the input voltage. Subsequently, in response to the low level signal, a current stops flowing through the switching circuit 14 with the result that a current flows through the backlight LEDs 12*a*. As a result, the LEDs 12*a* are turned on to brightly illuminate the LCD 12, allowing the user to see a message on the LCD 12. On receiving a message, for example, the pager 10 drives the alert LEDs 12*b* in the same manner as it drives the backlight LEDs 12*a*, thereby alerting the user to the incoming call. The difference is that the control section 26 delivers a high level signal and a low level signal to the alert LEDs 12*b* via an output LEDQ thereof alternately at predetermined intervals. As a result, the LEDs 12 each flashes in red at the predetermined intervals, facilitating the recognition of the received call.

In the illustrative embodiment, the alert LEDs 12*b* are disposed in the LCD 12, as shown in FIGS. 3A and 3B. Hence, even if the LCD 12 mounted on the front of the pager casing 10*a* has a relatively large area, it occupies a minimum of area on the front of the casing 10*a* and, therefore, allows the casing 10*a* to be miniaturized, compared to a conventional pager having an LCD and alert LEDs arranged side by side. Further, the LEDs 12*b*, disposed in the LCD 12, effect an alert via the LCD 12 and, therefore, surely informs the user of the incoming call.

Figure 4:
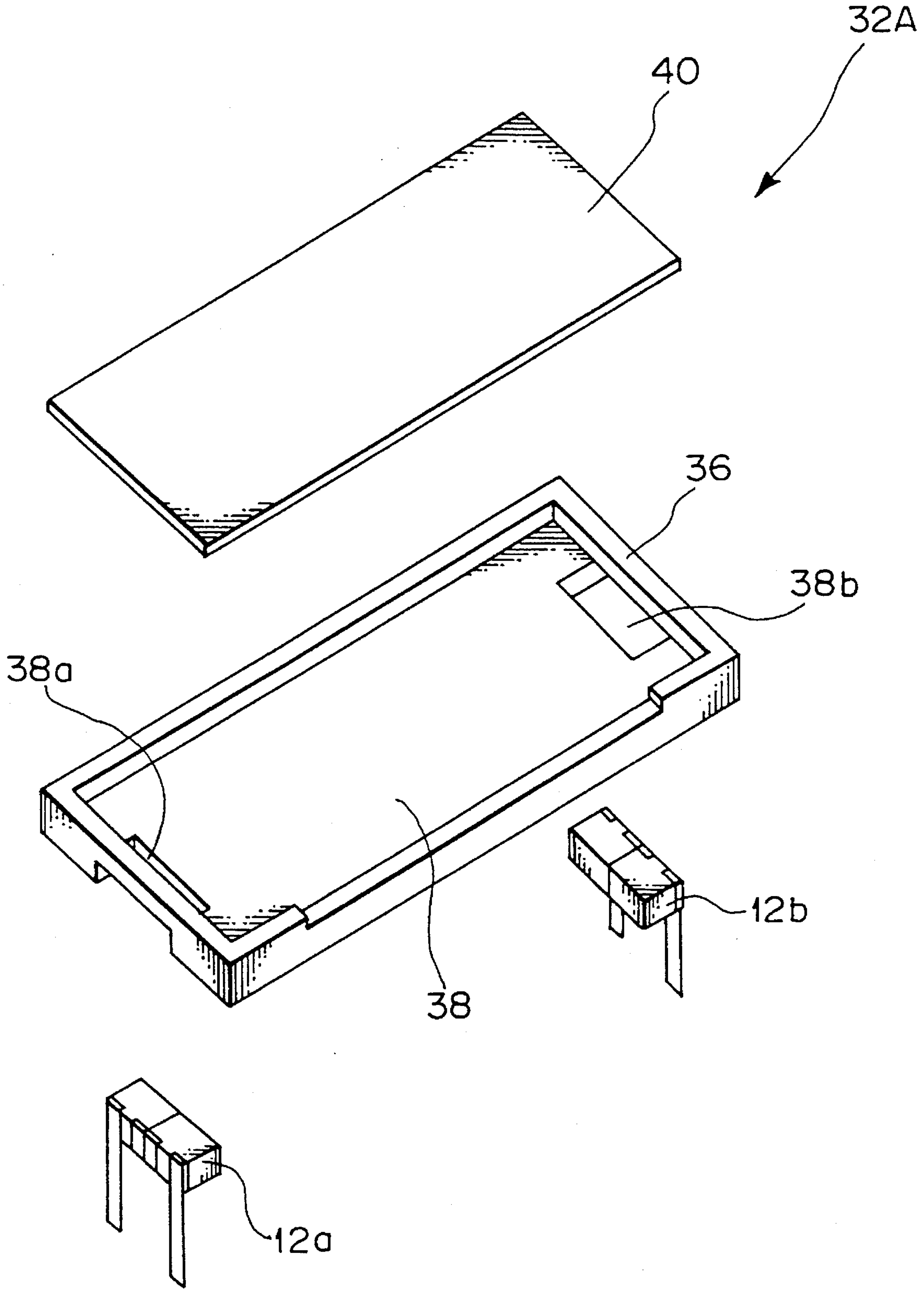
FIG. 4 is a view similar to FIG. 2, showing another specific backlight structure.

FIG. 4 shows another specific structure of the backlight. As shown, the backlight, generally 32A, has a rectangular saucer-like reflection frame 36 and a light conducting plate 38 which are formed integrally with each other. The light conducting plate 38 is formed with openings 38*a* and 38*b* at opposite ends thereof. The backlight LEDs 12*a* and alert LEDs 12*b* are securely received in the openings 38*a* and 38*b*, respectively. A diffusion sheet 40 is positioned on the light conducting plate 38. The backlight 32A is located at the rear of the LED 12 for illuminating it, as shown in FIG. 3B. The backlight 32A is simple in structure since it does not need a printed circuit board for supporting the LEDs 12*a* and 12*b*.

In summary, it will be seen that the present invention provides a data display radio pager having at least one alert LED disposed in a backlight together with at least one backlight LED and causes the alert LED to effect an alert via an LCD. Hence, when the LCD is mounted on the front of the casing of the pager, it is not necessary for the alert LED to be positioned beside the LCD. This provides the pager with a miniature configuration. Moreover, the alert LED does not have to be mounted on one side of the casing and, therefore, alerts the user to an incoming call without fail.

The backlight LED emits bright light while the alert LED emits light of red or similar striking color. This, coupled with the fact that the backlight LED glows continuously in the event of LCD display while the alert LED flashes, allows the flashing of the LED, i.e., an alert to be clearly recognized via the LCD.

Various modifications will become possible for those skilled in the art after receiving the teachings of the present disclosure without departing from the scope thereof.

What is claimed is:

1. A data display radio pager comprising:

a liquid crystal display screen mounted at a periphery of one side of a pager housing;

at least one backlight light emitting diode mounted adjacent to and for providing illumination visible through said liquid crystal display screen; and at least one alert light emitting diode mounted adjacent to and for providing illumination visible through said liquid crystal display screen for alerting a user of said radio pager to an incoming call; wherein said at least one backlight light emitting diode and said at least one alert light emitting diode are both located within said pager housing and between said liquid crystal display screen and a housing side opposite said one side so that each of said at least one backlight light emitting diode and said at least one backlight light emitting diode illuminates said liquid crystal display.

2. A radio pager as claimed in claim 1, further comprising a backlight structure for supporting said at least one backlight light emitting diode and said at least one alert light emitting diode within said liquid crystal display, the backlight structure including:

a printed circuit board supporting said backlight light emitting diode and said alert light emitting diode thereon;

a light reflection frame formed with windows through a bottom thereof for causing said backlight light emitting diode and said alert light emitting diode to appear therethrough;

a light conducting plate for conducting light emitted from each of said backlight light emitting diode and said alert light emitting diode; and a diffusion sheet for diffusing light emanating from said light conducting plate.

3. A radio pager as claimed in claim 2, wherein said backlight light emitting diode emits bright light continuously to display a message on the liquid crystal display and said alert light emitting diode emits light of striking color intermittently to alert the user to an incoming call.

4. A radio pager as claimed in claim 1, further comprising a backlight structure for supporting said at least one backlight light emitting diode and said at least one alert light emitting diode within said liquid crystal display, the backlight structure including:

a reflection frame;

a light conducting plate formed integrally with said reflection frame and provided with openings at opposite ends thereof for receiving said backlight light emitting diode and said alert light emitting diode, respectively; and a diffusion sheet for diffusing light emanating from said light conducting plate.

5. A radio pager as claimed in claim 4, wherein said backlight light emitting diode emits bright light continuously to display a message on the liquid crystal display and said alert light emitting diode emits light of striking color intermittently to alert the user to an incoming call.

6. A radio pager as claimed in claim 2, wherein said reflection frame has a rectangular shape and includes a cavity for receiving said light conducting plate and said diffusion sheet.

7. A radio pager as claimed in claim 4, wherein said reflection frame has a rectangular shape and includes a cavity for receiving said light conducting plate and said diffusion sheet.

8. A radio pager as claimed in claim 1, further comprising a casing and a support member received in the casing and supporting the backlight light emitting diode and the alert light emitting.

9. A radio pager as claimed in claim 8, wherein the support member comprises a printed circuit board.

10. A radio pager of claim 8, further comprising a reflection frame received in the casing and having a plurality of windows, the backlight light emitting diode and the alert light emitting diode each being positioned to protrude through one of the windows in the reflection frame.

11. A radio pager of claim 10, further comprising a light conducting plate for conducting light emitted from each of the backlight light emitting diode and the alert light emitting diode, and a diffusion sheet for diffusing light emanating from the light conducting plate.

12. A radio pager of claim 11, wherein the reflection frame has a rectangular shape and includes a cavity for receiving the light conducting plate and the diffusion sheet.

13. A radio pager of claim 10, further comprising a light conducting plate formed integrally with the reflection frame and provided with openings at opposite ends thereof of the light conducting plate for receiving the backlight light emitting diode and the alert light emitting diode, respectively, and a diffusion sheet for diffusing light emanating from the light conducting plate.

14. A radio pager of claim 13, wherein the reflection frame has a rectangular shape and includes a cavity for receiving the light conducting plate and the diffusion sheet.

15. A radio pager as claimed in claim 1, wherein the backlight light emitting emits a bright light continuously to illuminate a message on the display and the alert light emitting diode emits light of striking color intermittently to signal an incoming call.

* * * * *